(12) United States Patent
Schirrmacher et al.

(10) Patent No.: US 8,229,690 B2
(45) Date of Patent: Jul. 24, 2012

(54) TEST DEVICE AND A METHOD FOR CARRYING OUT A FUNCTION TEST ON A COMMUNICATION SYSTEM

(75) Inventors: Martin Schirrmacher, Buxtehude (DE); Uwe Schwark, Ottersberg (DE); Uwe Donnig, Cuxhaven (DE)

(73) Assignee: Airbus Operations GmbH, Hamburg (DE)

( * ) Notice: Subject to any disclaimer, the term of this patent is extended or adjusted under 35 U.S.C. 154(b) by 263 days.

(21) Appl. No.: 12/562,340

(22) Filed: Sep. 18, 2009

(65) Prior Publication Data
US 2010/0070222 A1 Mar. 18, 2010

Related U.S. Application Data

(60) Provisional application No. 61/192,461, filed on Sep. 18, 2008.

(51) Int. Cl.
*G01R 13/00* (2006.01)
*G01R 27/28* (2006.01)
*H04B 17/00* (2006.01)

(52) U.S. Cl. ....... 702/66; 324/612; 324/681; 455/67.11; 455/67.13; 455/67.14

(58) Field of Classification Search ............. 702/66; 324/612, 681; 455/67.11, 67.13, 67.14
See application file for complete search history.

(56) References Cited

U.S. PATENT DOCUMENTS

| | | | | | |
|---|---|---|---|---|---|
| 4,970,455 | A | * | 11/1990 | Suzuki et al. | 324/95 |
| 5,194,818 | A | * | 3/1993 | Scheibner | 324/617 |
| 5,548,820 | A | * | 8/1996 | Victorin | 455/67.14 |
| 6,243,042 | B1 | * | 6/2001 | d'Auria et al. | 343/703 |
| 7,808,251 | B2 | | 10/2010 | Krueger et al. | |
| 2009/0036880 | A1 | | 2/2009 | Bischoff et al. | 606/13 |

FOREIGN PATENT DOCUMENTS

DE 10 2005 032 141 1/2007
WO WO2007/006749 A1 * 1/2007

* cited by examiner

*Primary Examiner* — Janet Suglo
(74) *Attorney, Agent, or Firm* — Jenkins, Wilson, Taylor & Hunt, P.A.

(57) ABSTRACT

The present invention provides a test device and a method for carrying out a function test on a communication system. The test device contains a transmission path having at least one leaky line antenna arranged in the aircraft cabin, a control device coupled to the transmission path for feeding an HF signal at a predetermined power level into the leaky line antenna, and at least one measuring mechanism coupled at a predetermined coupling point to the transmission path to measure the power level of the HF signal at the coupling point and to transmit a result signal which depends on the measured power level via the leaky line antenna to the control device.

14 Claims, 5 Drawing Sheets

TEST DEVICE AND A METHOD FOR CARRYING OUT A FUNCTION TEST ON A COMMUNICATION SYSTEM

RELATED APPLICATIONS

This application claims the benefit of U.S. Provisional Application No. 61/192,461, filed Sep. 18, 2008, the entire disclosure of which is herein incorporated by reference.

BACKGROUND OF THE INVENTION

The present invention relates to a test device and a method for carrying out a function test on a communication system, in particular in an aircraft cabin, in particular in the aerospace sector.

Although it can be applied to any sector, the present invention is described in more detail with respect to an aircraft or a passenger aircraft.

Communication systems in aircraft cabins provide communication services or services such as GSM, UMTS, WLAN or the like for the crew of the aircraft or for passengers.

To emit the respective service signal for the corresponding service, a leaky line antenna may be used, which is arranged longitudinally in the aircraft cabin. To test the proper installation and function of the communication system, in particular to ensure the high frequency (HF) signal distribution within the aircraft cabin, a coverage measurement (radio supply measurement) is carried out in each frequency band of the corresponding services by means of an HF spectrum analyser and a measuring antenna at a plurality of different locations in the aircraft cabin. In this case, the measurement results may vary greatly depending on state and configuration of the aircraft cabin and selection of the measuring location. For this reason, the measurement results have to be averaged in a suitable manner and corrected by the respective antenna factors of the measuring antennas used.

A measurement carried out imprecisely or in a faulty manner may under some circumstances lead to predetermined, in particular official limit values being fallen below, evaluate conventional measurements, specially trained staff are also necessary. Such trained staff also have to have experience with HF measurements, in particular. Furthermore, the conventional measurements require special hardware, for example the HF spectrum analyser and the measuring antenna.

In order to be able to carry out the test at any location in the aircraft cabin, HF test signals are conventionally used, which have a power level requiring official approval. This official approval is conventionally necessary as the conventional HF test signals at the power levels used can still also be measured outside the aircraft and can potentially cause disruption of other services.

To solve these problems, a test device for automatically carrying out a function test on the communication system is known to the applicant in-house.

This in-house test device contains a transmission path, which has at least one leaky line antenna arranged in the aircraft cabin. This test device furthermore has a control device coupled to the transmission path, which has a generating mechanism for generating a broadband noise signal and a transmission mechanism for feeding an HF signal onto the leaky line antenna, the HF signal fed in having a predetermined power level and containing at least the generated broadband noise signal. Furthermore, this test device has a measuring mechanism coupled at a predetermined coupling point to the transmission path for measuring the power level of the HF signal at the coupling point and for providing a measuring signal proportional to the measured power level, and an evaluating means for providing a test result by means of a comparison between the measuring signal provided and a desired signal which depends on the power level of the HF signal fed in.

In this case, the measuring mechanism coupled via the transmission path is also connected to the control device by means of a first line for transmitting the measuring signal from the measuring mechanism to the control device and by a second line for the current supply of the measuring mechanism by means of the control device.

In this case, the first line and the second line have to be installed or laid in the aircraft cabin. A line installation of this type or cabling is disadvantageously expensive in terms of time and cost and furthermore contains the risk of faults in the line installation.

Accordingly, a need underlying to the present invention is to provide an automated function test on a communication system, in particular in an aircraft cabin, in which no additional line installation is necessary.

BRIEF DESCRIPTION OF THE INVENTION

According to the invention, this need is met by a test device with the features of claim 1 and by a method with the features of claim 14.

Accordingly, a test device for carrying out a function test on a communication system, in particular in an aircraft cabin, is proposed, which comprises:

a transmission path having at least one leaky line antenna arranged in the aircraft cabin;

a control device coupled to the transmission path for feeding an HF signal (high frequency signal) at a predetermined power level into the leaky line antenna; and at least one measuring mechanism coupled at a predetermined coupling point to the transmission path to measure the power level of the HF signal at the coupling point and to transmit a result signal which depends on the measured power level via the leaky line antenna to the control device.

Furthermore, a method for carrying out a function test on a communication system, in particular in an aircraft cabin, is proposed, which has the following steps:

feeding an HF signal by means of a control device into a transmission path with at least one leaky line antenna arranged in the aircraft cabin, the HF signal having a predetermined power level;

measuring the power level of the HF signal at a predetermined coupling point of the transmission path; and transmitting a result signal which depends on the measured power level via the leaky line antenna to the control device.

In this case, the core of the present invention consists in converting the power level of the HF signal by means of the measuring mechanism into a proportional signal, the result signal, and transmitting this signal back to the control device via the leaky line antenna.

An advantage of the present invention is that the automated function test according to the invention on the communication system manages without an additional outlay for cabling, because the result signal provided by the measuring mechanism is not transmitted via a dedicated line, but via the leaky line antenna back to the control device.

Expensive and time-consuming line installation is thus dispensed with.

Furthermore, communication systems already installed in an aircraft cabin can be easily and economically retrofitted by the test device according to the invention because line installation is not required.

Advantageous configurations and improvements of the invention are found in the sub-claims.

According to a preferred configuration of the invention, the control device has a test means, which is set up to provide a test result as a function of the result signal transmitted via the leaky line antenna.

The test means is set up, in particular, to calculate the test result by means of a comparison between the result signal transmitted via the leaky line antenna and a desired signal which depends on the power level of the HF signal fed in.

According to a further preferred configuration, the control device has a transmission mechanism, which is suitable for feeding the HF signal at the predetermined power level into the leaky line antenna, the HF signal fed in causing a predetermined current flowing through the leaky line antenna.

According to a further preferred configuration, the measuring mechanism has a measuring means and a modulation means. The measuring means measures the power level of the HF signal at the coupling point. The modulation means modulates the current flowing through the leaky line antenna as a function of the power level measured by the measuring means.

According to a further preferred configuration, the measuring mechanism has an HF detector and a controllable resistor. The HF detector converts the power level of the HF signal at the coupling point into a proportional direct voltage signal, which controls the controllable resistor to modulate the current flowing through the leaky line antenna.

The controllable resistor is, in particular, switched between the leaky line antenna and earth.

According to a preferred development of the invention, the test means is set up to provide the test result as a function of the current modulated on the leaky line antenna.

According to a further preferred configuration, the control device has a feed mechanism or supply mechanism, which is set up to transmit a feed current for the measuring mechanism via the leaky line antenna to the measuring mechanism.

According to a further preferred development, the controllable resistor is set up to superimpose a result current proportional to the direct voltage signal of the HF detector on the feed current of the feed mechanism on the leaky line antenna.

According to a further preferred development, the test means is set up to provide or calculate the test result as a function of the result current superimposed on the feed current on the leaky line antenna.

According to a further preferred development, the modulation means is set up to provide an NF signal (low frequency signal) as a function of the power level of the HF signal measured by the measuring means.

According to a further preferred configuration, the measuring mechanism has a transmission means, which is set up to transmit the modulated NF signal to the control device via the leaky line antenna.

In this case, the NF signal is input by the measuring mechanism into the transmission path and output again by the control device. The NF signal may, in this case, be modulated by means of either analogue modulation or digital modulation, such as FSK, ASK, PSK and the like.

According to a further preferred configuration, the HF signal comprises a broadband noise signal and/or at least one service signal for providing a service.

According to a further preferred configuration, the noise signal is broadband compared to a coherence bandwidth of the transmission path.

In the context of the present application, the coherence bandwidth Wc is defined by means of the frequency-time autocorrelation function jFT (Df, Dt=0) of the channel transmission function:

$$|jFT(Df=Wc, Dt=0)| = \tfrac{1}{2} |jFT(Df=0, Dt=0)|$$

The coherence bandwidth Wc is the value at which the value of the frequency-time autocorrelation function with growing $\Delta f$ has dropped to half for the first time. This is thus a measure of the frequency difference $\Delta f$, by which two sinusoidal signals have to differ before they find completely different channel transmission properties during transmission. If the signal bandwidth W is smaller than the coherence bandwidth Wc, all the spectral signal fractions find substantially the same transmission properties. Consequently, the coherence bandwidth Wc approximately designates the maximum frequency interval, via which two frequency components of a signal experience a comparable or correlated amplitude loss.

If the time spread of the signal caused by the multipath spreading on the radio channel, the multipath spread (time delay spread) is D seconds, then the following approximately applies to the coherence bandwidth Wc in Hz:

$$Wc * 1/(2pD).$$

Furthermore, the control device is configured, in particular, as a computer program product, which is preferably part of the network control unit (NCU) of the aircraft cabin.

The computer program product is preferably set up to bring about the implementation of steps to configure the function of the control device on a program-controlled mechanism, such as the network control unit.

A computer program product such as a computer program means may be provided or delivered, for example, as a memory medium, such as a memory card, USB stick, floppy disc, CD-ROM. DVD or else in the form of a downloadable data file from a server in a network. This may take place, for example, in a wireless communication network by means of the transmission of a corresponding data file with the computer program product or the computer program means.

According to a further preferred configuration, the broadband noise signal contains at least one masking signal. The respective masking signal is in particular suitable for masking a respective terrestrial base station signal, which uses a respective predetermined frequency band.

According to a preferred development of the invention, the measuring mechanism has an HF termination.

According to a further preferred development, the measuring mechanism has a terminating resistor for HF termination. Alternatively, the measuring mechanism is coupled to a terminating resistor for HF termination.

In particular, the transmission path has a first end and a second end. The leaky line antenna is preferably coupled between the first end and the second end. Furthermore, the control device is preferably coupled to the first end.

According to a further preferred configuration, the generating mechanism has a number of noise generators. The respective noise generator is preferably suitable for providing a respective noise signal limited to a predetermined frequency band.

According to a further preferred configuration, the control mechanism has a selection means. The selection means is preferably suitable for selecting at least one of the number of noise generators to provide a band-limited noise signal for the HF signal.

The respective frequency band of the band-limited noise signal is preferably adjusted to a corresponding predetermined frequency band of a respective terrestrial base station.

According to a further preferred development, the control device has a trigger means. The trigger means is preferably set up to trigger the implementation of the function test with the selected band-limited noise signal.

The trigger means is in particular further set up to serially implement a plurality of function tests with different, selected band-limited noise signals.

The test means is preferably set up to provide a test result vector as a function of the plurality of serially implemented function tests of the communication system. For example, the leaky line antenna is configured as a coaxial line with a plurality of perforations. The plurality of perforations may also comprise slots and/or holes.

The result signal is configured, for example, as a current signal or as a frequency signal, in particular as an NF signal.

According to a further preferred development, the measuring device has an HF detector. The HF detector is preferably suitable for converting the power level of the HF signal at the coupling point into a proportional direct voltage signal.

According to a further preferred configuration, the transmission path has a transmitting leaky line antenna arranged longitudinally in the aircraft cabin and a receiving leaky line antenna arranged longitudinally in the aircraft cabin.

For example, the transmitting leaky line antenna and the receiving leaky line antenna are arranged in parallel in the aircraft cabin and in each case coupled between the first end and the second end of the transmission path.

According to a further preferred development, a plurality of measuring mechanisms is provided, a first measuring mechanism being coupled at the second end of the transmission path to the transmitting leaky line antenna and a second measuring mechanism being coupled at the first end of the transmission path to the receiving leaky line antenna.

According to a further preferred development, at least one transceiver mechanism is provided. The respective transceiver mechanism is preferably suitable for providing a service signal to provide a predetermined service, and for transmission via the transmission path.

The transceiver mechanism preferably integrates the second measuring mechanism.

According to a further preferred development, a combining mechanism is provided, which is set up to combine the provided broadband noise signal and the at least one service signal to form the HF signal to be fed onto the transmission path.

According to a further preferred development, a combining mechanism is provided, which is set up to combine the band-limited noise signals provided by the noise generators and the at least one service signal to form the HF signal to be fed onto the transmission path.

According to a further preferred development, a fault detection means is provided which is suitable to detect a fault of one or more noise generators and/or a fault on the transmission path as a function of the test result vector provided.

According to a further preferred configuration, the test device is suitable to test the communication system during operation of the communication system.

BRIEF DESCRIPTION OF THE DRAWINGS

The invention will be described in more detail below with the aid of embodiments with reference to the accompanying figures, in which.

DETAILED DESCRIPTION OF THE INVENTION

Figure 1:
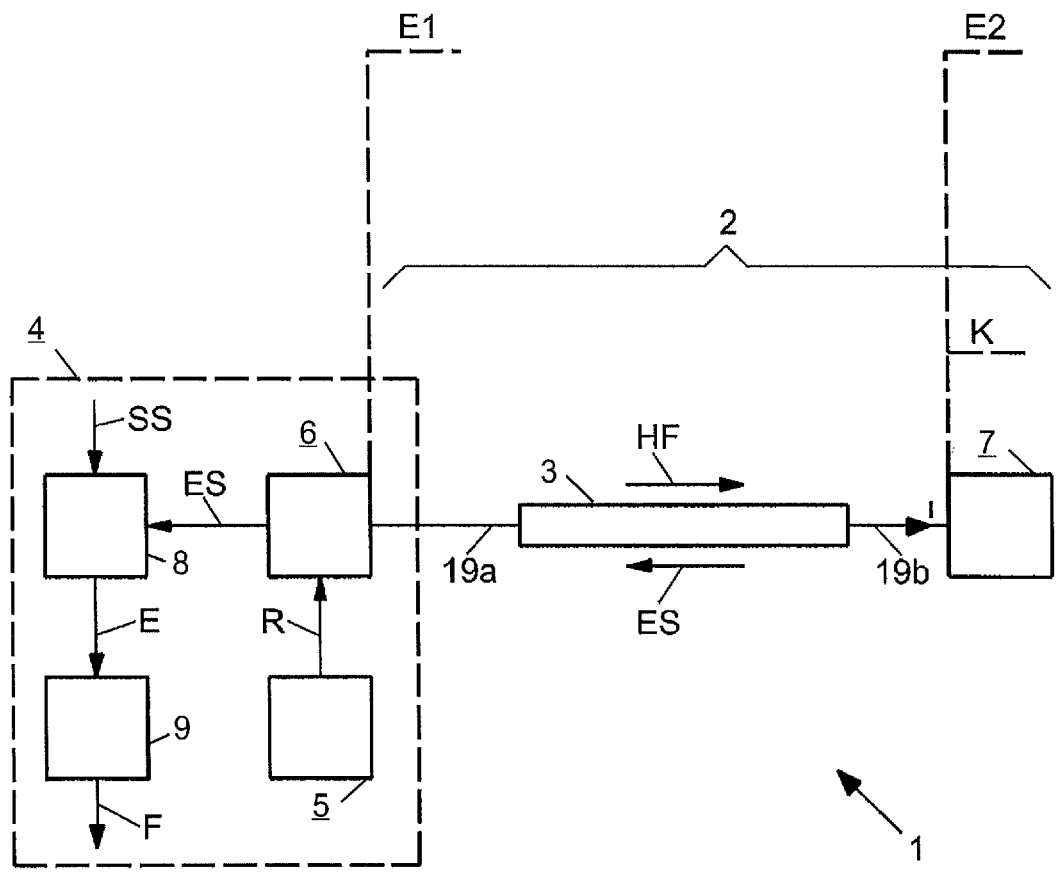
FIG. 1 shows a schematic block diagram of a first embodiment of the test device according to the invention.

In the figures, the same reference numerals denote identical or functionally identical components—as long as nothing is stated to the contrary.

FIG. 1 shows a schematic block diagram of a first embodiment of a test device 1 for carrying out a function test on a communication system in an aircraft cabin of an aircraft. The test device 1 has a transmission path 2, a control device 4 coupled to the transmission path 2, at least one measuring mechanism 7 coupled at a predetermined coupling point K to the transmission path 2 and preferably a test means 8.

The test device 1 is preferably set up to test the communication system even during operation of the communication system.

The transmission path 2 has at least one leaky line antenna 3 arranged in the aircraft cabin. The leaky line antenna 3 is, for example, configured as a coaxial line with a plurality of perforations.

The control device 4 is coupled, for example, by means of a line 19a to the leaky line antenna 3. The control device 4 preferably has a generating mechanism 5 to generate a broadband noise signal R and a transmission mechanism 6 to feed in an HF signal HF onto the leaky line antenna 3.

The HF signal HF preferably comprises the noise signal R and at least one service signal D1. The HF signal HF fed in has an adjusted or predetermined power level and contains at least the generated broadband noise signal R. The noise signal R provided by the generating mechanism 5 is broadband compared to a coherence bandwidth of the transmission path 2. Furthermore, the broadband noise signal R provided preferably contains at least one masking signal (not shown). The respective masking signal is suitable to mask a respective terrestrial base station signal, which uses a respective predetermined frequency band.

The measuring mechanism 7 is suitable for measuring the power level of the HF signal HF at the coupling point K. Furthermore, the measuring mechanism 7 is suitable for transmitting a result signal ES which depends on the measured power level, via the leaky line antenna 3 to the control device 4.

The measuring mechanism 7 preferably contains a terminating resistor for HF termination or is alternatively coupled to a terminating resistor 11 for HF termination. Furthermore, the measuring mechanism 7 is coupled by a line 19b to the leaky line antenna 3.

Figure 2:
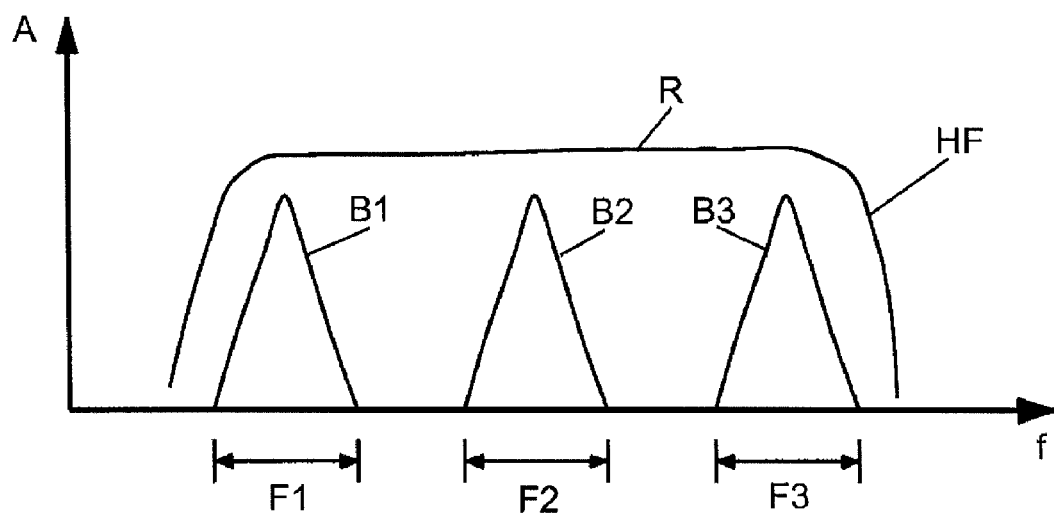
FIG. 2 shows a schematic amplitude frequency graph with a first embodiment of an HF signal according to the invention and three terrestrial base station signals.
Figure 3:
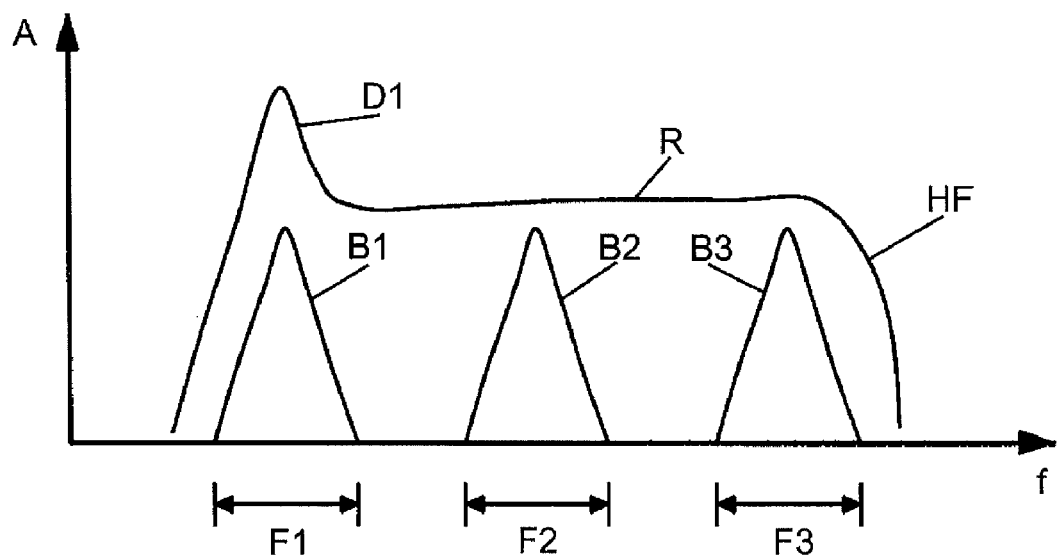
FIG. 3 shows a schematic amplitude frequency graph with a second embodiment of the HF signal according to the invention and three terrestrial base station signals.

FIG. 2 shows a schematic amplitude-frequency graph with a first embodiment of the HF signal HF according to the invention and three terrestrial base station signals B1-B3. Analogously, FIG. 3 shows a schematic amplitude-frequency graph with a second embodiment of the HF signal HF according to the invention and the three terrestrial base station signals B1-B3. According to FIG. 2, the HF signal HF corresponds to the noise signal R provided. In contrast to this, the HF signal according to FIG. 3 comprises the noise signal R and a service signal D1 positioned thereabove.

Also with reference to FIG. 1, the control device 4 preferably has the test means 8. The test means 8 is set up to provide a test result E as a function of the result signal ES transmitted via the leaky line antenna 3. In this case, the test means 8 is in particular set up to calculate the test result E by means of a comparison between the result signal ES transmitted via the leaky line antenna 3 and a desired signal SS which depends on the power level of the HF signal HF fed in.

Furthermore, the control device 4 preferably comprises a fault detection means 9, which is set up to detect a fault F on the transmission path 2 as a function of the test result E.

As stated above, the control device 4 preferably has a transmission mechanism 6. The transmission mechanism 6 is set up, in particular, to feed the HF signal HF at the predetermined power level into the leaky line antenna 3. The control device 4 feeds, in particular, a predefined direct current into the leaky line antenna 3, which is used, on the one hand, for the test on the electrical connection from the control device 4 to the terminating resistor 11 and, on the other hand, is changed in the course of the HF measurement by the measuring device 4. The changing of the direct current is then proportional to the measurement result and therefore to the result signal. Furthermore, the transmission mechanism 6 is set up to receive the result signal ES from the measuring mechanism 7 via the charging line antenna 3.

The transmitting path 2, in particular, has a first end E1 and a second end E2. The leaky line antenna 3 is coupled between the first end E1 and the second end E2. The control device 4 is, for example, coupled to the first end E1 and the measuring mechanism 7 is coupled, for example, to the second end E2.

Figure 4:
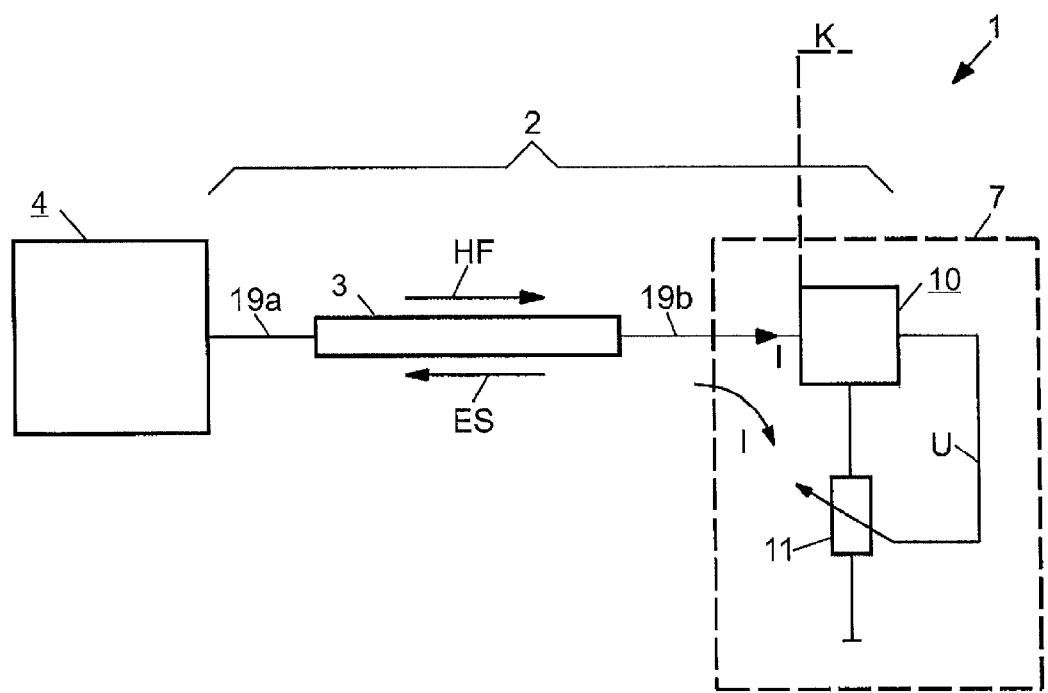
FIG. 4 shows a schematic block diagram of a second embodiment of the test device according to the invention.
Figure 6:
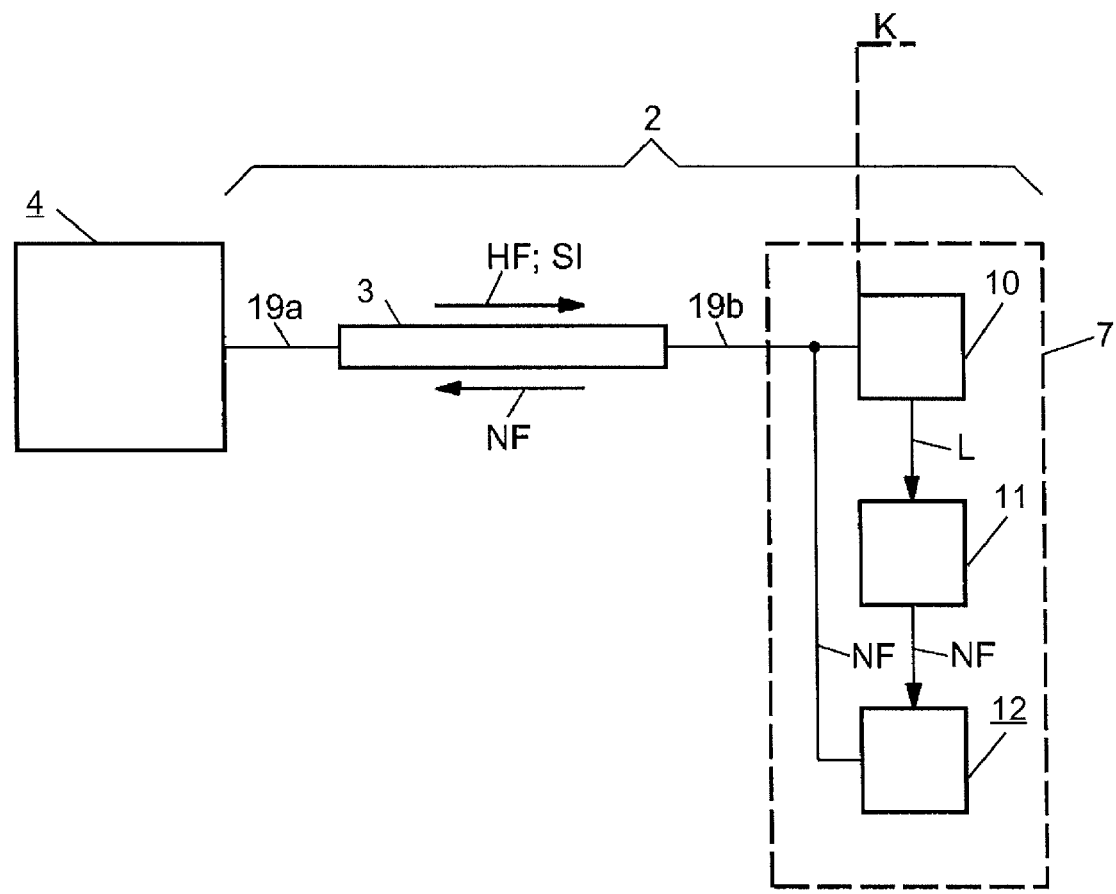
FIG. 6 shows a schematic block diagram of a third embodiment of the test device according to the invention.

The further embodiments of the test device 1 according to FIGS. 4 and 6 have all the features of the first embodiment of the test device 1 according to FIG. 1. With regard to the features in FIGS. 4 and 6, which are also shown in FIG. 1, reference is herewith made to FIG. 1 to avoid repetition.

FIG. 4 shows a schematic block diagram of a second embodiment of the test device 1 according to the invention. In this case, the second embodiment according to FIG. 4 differs from the first embodiment according to FIG. 1, in particular with respect to the configuration of the measuring device 7.

The measuring device 7 according to FIG. 4 has an HF detector 10 and a controllable resistor 11. The HF detector 10 converts the power level of the HF signal HF at the coupling point K into a proportional direct voltage signal U, which controls the controllable resistor 11 for modulation of the direct current I flowing through the leaky line antenna 3.

The test means 8 of the control device 4 can then be set up to provide the test result E as a function of the current I modulated on the leaky line antenna 3.

Furthermore, the control device 4 may be equipped with a feed mechanism (not shown), which is set up to transmit a feed current SI for the measuring mechanism 7 via the leaky line antenna 3 to the measuring mechanism 7.

In a case such as this, the controllable resistor 11 is preferably set up to superimpose a result current ES proportional to the direct voltage signal U of the HF detector 10 on the feed current SI of the feed mechanism on the leaky line antenna 3. The result current ES then corresponds to the result signal ES.

Figure 5:
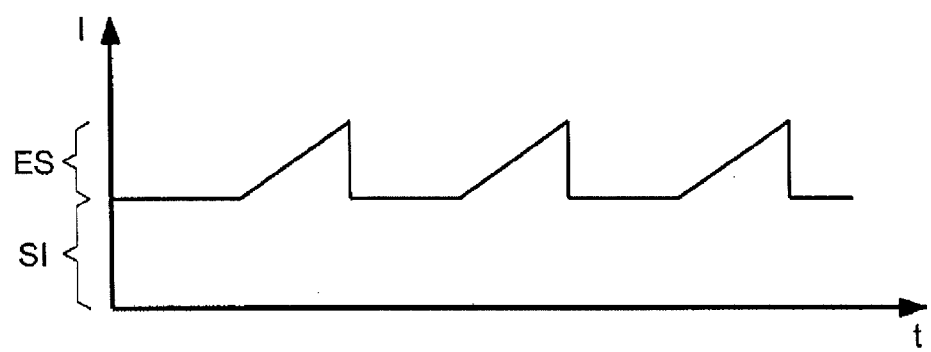
FIG. 5 shows a schematic current-time graph with an embodiment of the current on the leaky line antenna according to the invention.

For this purpose. FIG. 5 shows a schematic current-time graph with an embodiment of the current I on the leaky line antenna 3 according to the invention. The current I is in this case composed of the feed current SI and the result current ES.

In a case such as this, the test means 8 of the control device 4 can be set up to provide the test result E as a function of the result current ES superimposed on the feed current SI on the leaky line antenna 3.

FIG. 6 shows a schematic block diagram of a third embodiment of the test device 1 according to the invention. A third embodiment according to FIG. 6 differs from the second embodiment according to FIG. 4 with respect to the configuration of the measuring device 7.

The measuring device 7 according to FIG. 6 has a measuring means 10 and a modulation means 11. The measuring means 10 measures the power level L of the HF signal HF at the coupling point K. The modulation means 11 modulates, for example, the current I flowing through the leaky line antenna 3 as a function of the power level L measured by the measuring means 10.

Alternatively, the modulation means 11 is set up to provide an NF signal NF as a function of the power level L of the HF signal HF measured by the measuring means 10. To transmit the NF signal provided, the measuring mechanism 7 preferably has a transmission means 12, which is set up to transmit the modulated NF signal NF to the control device 4 via the leaky line antenna 3.

Figure 7:
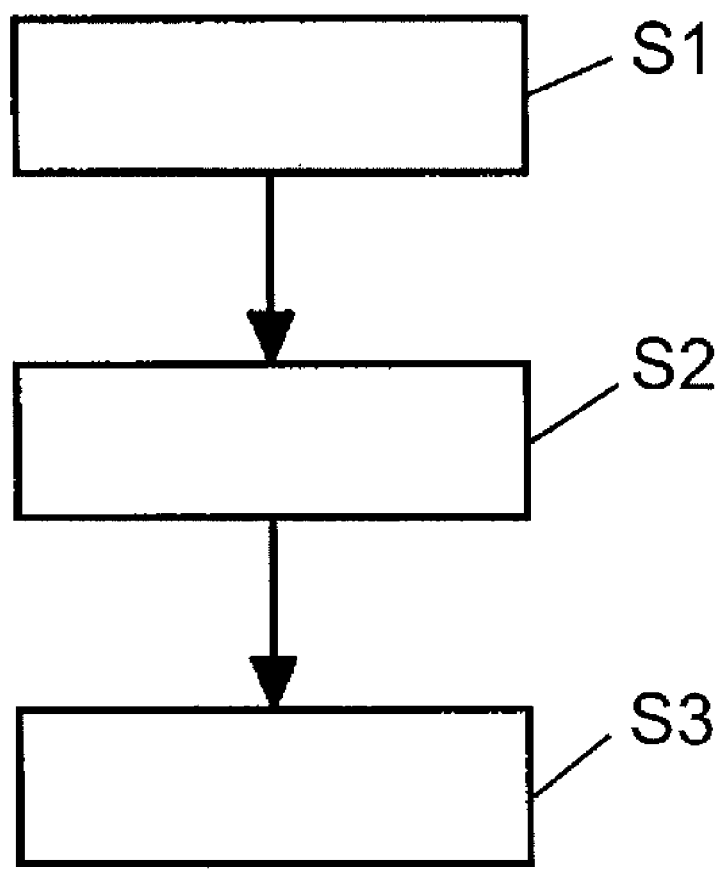
FIG. 7 shows a schematic flow chart of an embodiment of a method for carrying out a function test of a communication system.

FIG. 7 shows a schematic flow chart of an embodiment of a method according to the invention to carry out a function test on a communication system in an aircraft cabin of an aircraft.

The method according to the invention will be described below with the aid of the block diagram in FIG. 7 with reference to the block diagram in FIG. 1. The method according to the invention according to FIG. 7 has the method steps S1-S3:

Method Step S1:
An HF signal is fed by a control device 4 into a transmission path 2 with at least one leaky line antenna 3 arranged in the aircraft cabin, the HF signal HF having a predetermined power level.

Method Step S2:
The power level of the HF signal HF is measured at a predetermined coupling point K of the transmission path 2. The coupling point K differs from the feed point of the HF signal.

Method Step S3:
A result signal ES which depends on the measured power level is transmitted back via the leaky line antenna 3 to the control device 4 to calculate a test result E.

Although the present invention was described with the aid of preferred embodiments, it is not limited thereto, but can be modified in a diverse manner.

The invention claimed is:

1. A test device for carrying out a function test on a communication system in an aircraft cabin, comprising
a transmission path having at least one leaky line antenna arranged in the aircraft cabin;
a control device coupled to the transmission path for feeding a high frequency signal at a power level into the leaky line antenna;
wherein at least one measuring mechanism is coupled at a coupling point to the transmission path capable of measuring the power level of the high-frequency signal at the coupling point, and transmitting a resulting signal thereof;

wherein the measuring mechanism comprises a measuring means and a modulation means;
wherein the measuring means is capable of measuring the power level of the high frequency signal at the coupling point; and
wherein the modulation means is capable of modulating a current to flow through the leaky line antenna as a function of the power level of the high frequency signal measured by the measuring means.

2. The test device according to claim 1, wherein the control device comprises a test means, capable of providing a test result as a function of the resulting signal transmitted via the leaky line antenna.

3. The test device according to claim 2, wherein the test means is capable of providing the test result as a function of the current modulated through the leaky line antenna.

4. The test device according to claim 1, wherein the control device comprises a transmission mechanism, capable of feeding the high frequency signal into the leaky line antenna, thereby causing a current to flow through the leaky line antenna.

5. The test device according to claim 1, wherein the measuring mechanism further comprises a high frequency detector and a controllable resistor,
wherein the high-frequency detector is capable of converting the power level of the high frequency signal at the coupling point into a proportional direct voltage signal, thereby controlling the controllable resistor to modulate the current flowing through the leaky line antenna.

6. The test device according to claim 5, wherein the control device comprises a feed mechanism capable of transmitting a feed current via the leaky line antenna to the measuring means.

7. The test device according to claim 6, wherein the controllable resistor is capable of superimposing a resulting current proportional to a voltage signal of the high frequency detector, on the feed current of the feed mechanism through the leaky line antenna.

8. The test device according to claim 6, wherein the test means is capable of providing the test result as a function of the resulting current superimposed on the feed current through the leaky line antenna.

9. The test device according to claim 1, wherein the modulation means is capable of providing a modulated low frequency signal as a function of the power level of the high frequency signal measured by the measuring means.

10. The test device according to claim 9, wherein the measuring mechanism comprises a transmission means capable of transmitting the modulated low frequency signal to the control device via the leaky line antenna.

11. The test device according to claim 1, wherein the measuring means comprises a terminating resistor for high frequency termination.

12. The test device according to claim 1, wherein the transmission path comprises a first end and a second end,
wherein the leaky line antenna is coupled between the first end and the second end of the transmission path,
wherein the control device is coupled to the first end of the transmission path, and
wherein the measuring mechanism is coupled to the second end of the transmission path.

13. The test device according to claim 1, wherein the test device is capable of testing the communication system during operation of the communication system.

14. A method for carrying out a function test on a communication system in an aircraft cabin of an aircraft comprising the steps:
feeding an high frequency signal by means of a control device into a transmission path with at least one leaky line antenna arranged in the aircraft cabin;
measuring the power level of the high frequency signal at a coupling point of the transmission path by a measuring means; and
modulating a current proportional to the power level of the high frequency signal flowing through the leaky line antenna by a modulating means, creating a resulting signal, and
transmitting the resulting signal via the leaky line antenna to the control device.

* * * * *